United States Patent
Gorman et al.

(10) Patent No.: US 9,172,373 B2
(45) Date of Patent: Oct. 27, 2015

(54) VERIFYING PARTIAL GOOD VOLTAGE ISLAND STRUCTURES

(71) Applicant: INTERNATIONAL BUSINESS MACHINES CORPORATION, Armonk, NY (US)

(72) Inventors: Kevin W. Gorman, Fairfax, VT (US); Steven F. Oakland, Colchester, VT (US); Michael R. Ouellette, Westford, VT (US); Steven J. Urish, Burlington, VT (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 132 days.

(21) Appl. No.: 14/019,957

(22) Filed: Sep. 6, 2013

(65) Prior Publication Data

US 2015/0070048 A1 Mar. 12, 2015

(51) Int. Cl.
*H03K 19/003* (2006.01)
*G06F 17/50* (2006.01)
*G06F 1/32* (2006.01)

(52) U.S. Cl.
CPC ........ *H03K 19/00392* (2013.01); *G06F 1/3287* (2013.01); *G06F 17/505* (2013.01); *G06F 2217/72* (2013.01); *G06F 2217/78* (2013.01)

(58) Field of Classification Search
CPC ............... H03K 19/17764; H03K 19/00392
USPC ....................................................... 326/9–10
See application file for complete search history.

(56) References Cited

U.S. PATENT DOCUMENTS

| | | | |
|---|---|---|---|
| 5,526,514 A | 6/1996 | Pradhan et al. | |
| 6,631,502 B2* | 10/2003 | Buffet et al. | 716/111 |
| 6,779,163 B2* | 8/2004 | Bednar et al. | 716/113 |
| 6,820,240 B2* | 11/2004 | Bednar et al. | 716/113 |
| 6,883,152 B2 | 4/2005 | Bednar et al. | |
| 7,032,191 B2 | 4/2006 | Malekkhosravi et al. | |
| 7,103,860 B2 | 9/2006 | Price et al. | |
| 7,111,266 B2 | 9/2006 | Correale et al. | |
| 7,131,074 B2* | 10/2006 | Bednar et al. | 326/81 |
| 7,386,828 B1 | 6/2008 | Safarpour et al. | |
| 7,609,799 B2* | 10/2009 | Li | 375/376 |
| 7,661,050 B2* | 2/2010 | Huben et al. | 714/733 |
| 7,984,398 B1 | 7/2011 | Jadcherla | |
| 8,015,521 B2 | 9/2011 | Moon | |
| 8,086,980 B2 | 12/2011 | Vogel | |
| 8,195,857 B2* | 6/2012 | Barrenscheen | 710/110 |
| 8,255,859 B2 | 8/2012 | Chilwal et al. | |
| 8,392,867 B2 | 3/2013 | Deng et al. | |
| 8,413,088 B1 | 4/2013 | Armbruster et al. | |
| 2004/0268278 A1* | 12/2004 | Hoberman et al. | 716/5 |
| 2005/0081173 A1 | 4/2005 | Peyran | |
| 2009/0154269 A1* | 6/2009 | Linzer et al. | 365/200 |

* cited by examiner

*Primary Examiner* — Jason M Crawford
(74) *Attorney, Agent, or Firm* — Andrew M. Calderon; Roberts Mlotkowski Safran & Cole, P.C.

(57) ABSTRACT

Structures, methods, and systems for designing and verifying integrated circuits including redundant logic blocks are provided. An integrated circuit includes selection logic and selectable logic blocks that are individually controllable by the selection logic. The selectable logic blocks include respective instances of a redundant logic block, and respective instances of an interface logic block that selectively disable the redundant logic blocks in the integrated circuit.

19 Claims, 6 Drawing Sheets

VERIFYING PARTIAL GOOD VOLTAGE ISLAND STRUCTURES

FIELD OF INVENTION

The invention relates to integrated circuits and, more particularly, to designing and verifying integrated circuits including redundant logic blocks.

BACKGROUND

Integrated circuit ("IC") designs are becoming more complicated over time. Power consumption and yield limit the production of complex integrated circuits designs. To address power consumption limitations, some integrated circuit designs use voltage islands. Voltage islands are individually controllable power regions. By placing elements of an integrated circuit in different voltage islands, the integrated circuit can selectively operate elements in one or more of the voltage islands at a lower voltage and/or power-off the elements when their function (e.g., processing or data retention) is not required.

To address yield issues, some integrated circuits are designed to function as partial good chips. A partial good chip is an integrated circuit including one or more elements that are redundant of another element, wherein the redundant elements are not necessary for function of the integrated circuit chip, but operated in case of a defect or failure of a like element. For example, a design for a partial good chip can include ten processor cores, wherein two of the processor cores are redundant. Each of the processor cores can be located in a respective voltage island and be connected to through gating logic that allows an individual processor core to be ignored, bypassed, and/or avoided. Because two of the processor cores are not required for the integrated circuit to function as designed, a manufacturing process that produces the processor cores with less than a 100% yield is likely to produce chips with a sufficient number of good processor cores.

Integrated circuit chips combining voltage islands and redundant structures increase the time and complexity of chip design. Moreover, because verifying designs for integrated circuits can involve triple the effort used in designing the integrated circuits, verification of designs for integrated circuit chips having voltage-islanded redundant structures can involve an unpractical amount of time.

Accordingly, there exists a need in the art to overcome the deficiencies and limitations described hereinabove.

SUMMARY

In an aspect of the invention, there is an integrated circuit including selection logic and selectable logic blocks individually controllable by the selection logic. The selectable logic blocks include respective instances of a redundant logic block, and respective instances of an interface logic block that selectively disable the redundant logic blocks in the integrated circuit.

In another aspect of the invention, there is a method for providing an integrated circuit. The method includes determining an interface logic block based on a redundant logic block included in the integrated circuit. The method also includes combining the redundant logic block and the determined interface logic block into a selectable logic block. The method further includes determining connections between selection logic and instances of the selectable logic block.

In another aspect of the invention, there is a method that includes identifying a first redundant logic block of a number of redundant logic blocks in an integrated circuit for disablement. The redundant logic blocks are included in respective selectable logic blocks. The selectable logic blocks include interface logic blocks that fence the respective redundant logic blocks from functional logic of the integrated circuit. The method also includes recording information identifying the first redundant logic block in selection logic of the integrated circuit. The method further includes, based on the information recorded in the selection logic, disabling the first redundant logic block via the interface logic block of the respective selectable logic block.

In another aspect of the invention, a design structure tangibly embodied in a machine readable storage medium for designing, manufacturing, or testing an integrated circuit is provided. The design structure comprises a three-dimensional integrated chip stack. In further embodiments, a hardware description language (HDL) design structure encoded on a machine-readable data storage medium comprises elements that when processed in a computer-aided design system generates a machine-executable representation of the integrated circuit chip of the present invention. In still further embodiments, a method in a computer-aided design system is provided for generating a functional design model of the integrated circuit chip of the present invention. The method comprises generating a functional representation of the structural elements of the integrated circuit chip of the present invention.

BRIEF DESCRIPTION OF THE SEVERAL VIEWS OF THE DRAWINGS

The present invention is described in the detailed description that follows, in reference to the noted plurality of drawings by way of non-limiting examples of exemplary embodiments of the present invention.

DETAILED DESCRIPTION

The invention relates to integrated circuits and, more particularly to designing and verifying integrated circuits including redundant logic blocks. According to aspects of the present invention, methods and related structures are provided for integrated circuits that allow for segmented verification of redundant logic blocks control logic. That is, the effort of verification is divided into pieces. Logic function verification (leveraging normal functional logic simulation/coverage techniques) verifies the basic building blocks (e.g., individual logic blocks). Structural verification verifies the building blocks are connected together correctly at the chip level. Additionally, aspects of the invention allow for chip-level verification of redundant logic blocks using only one representative permutation in which one or more of the redundant logic blocks is disabled in accordance with a partial-good chip design. Thus, segmented verification in accordance with aspects of the invention disclosed herein saves a large amount of verification effort compared to conventional techniques.

In embodiments, a number of redundant logic blocks are located within respective voltage islands such that any one or more of the redundant logic blocks can be disabled by selectively gating (i.e., reducing or stopping) power to the corresponding voltage islands. These logic blocks can be referred to as "partial good voltage island blocks" since one or more of the redundant logic blocks need not be functional for the integrated circuit to function as designed. In other words, the redundant logic blocks of the integrated circuit can be "partially good" such that the manufacturing yield of the redundant logic blocks can be less than 100% to produce an integrated circuit that functions as-designed. For example, each of the redundant logic blocks can include a processor core of a multi-processor controller and/or a block of memory logic. The redundant logic blocks are not limited to processor cores and memory block and, instead, can be any type of structure that is repeated in an integrated circuit chip (e.g., gate arrays).

According to aspects of the invention, an integrated circuit design incorporates interface logic and selection logic. In embodiments, the interface logic provides an interface (e.g., a wrapper or a fence) that fences individual redundant logic blocks from other elements of an integrated circuit. In aspects of the invention, interface logic is individually controllable by the selection logic to selectively disable and/or disconnect the redundant logic blocks from the other functional elements of the integrated circuit. For example, where the redundant logic blocks include processor cores, the interface logic can include switching logic connecting inputs and outputs of each of the processor cores to other functional logic (e.g., processors, memory, storage, communication, data buses, etc.) included in the integrated circuit. Additionally, the interface logic can include switching logic to connect each of the power inputs to a respective power source (e.g., a voltage island).

According to aspects of the invention, the selection logic and the interface logic are predesigned elements (e.g., logic blocks) retrievable from a library and have predetermined interconnections. In embodiments, the interconnections are defined using special connections (e.g., unique pin types, which can be signified via keywords or attributes in the design data), wherein only certain valid connections (e.g., types) are allowed to be interconnected. As such, the selection logic and the interface logic can only validly connect in a single way. For example, pin types can be predefined in the software definitions (e.g., VHDL) of the selection logic and interface logic.

Advantageously, aspects of the present invention greatly reduce the effort involved in designing and verifying integrated circuits having voltage-islanded redundant logic blocks. This is because the predefined selection logic and the interface logic minimizes the design effort involved in designing and verifying logic used to selectively disable and/or disconnect the redundant logic blocks from power and data paths. Additionally, in accordance with aspects of the invention, each instance of a redundant logic block and interface logic block is the same. And, since the interconnections between the selection logic and interface logic are predetermined, a single instance of a redundant logic block and its interface with a single interface logic block can be used for verifying the design of their combination. Moreover, chip-level verification can be performed on only one representative permutation of the integrated circuit in which a given number of redundant logic block instances included in the design of the integrated circuit are disabled by the selection logic using the respective interface logic.

Figure 1:
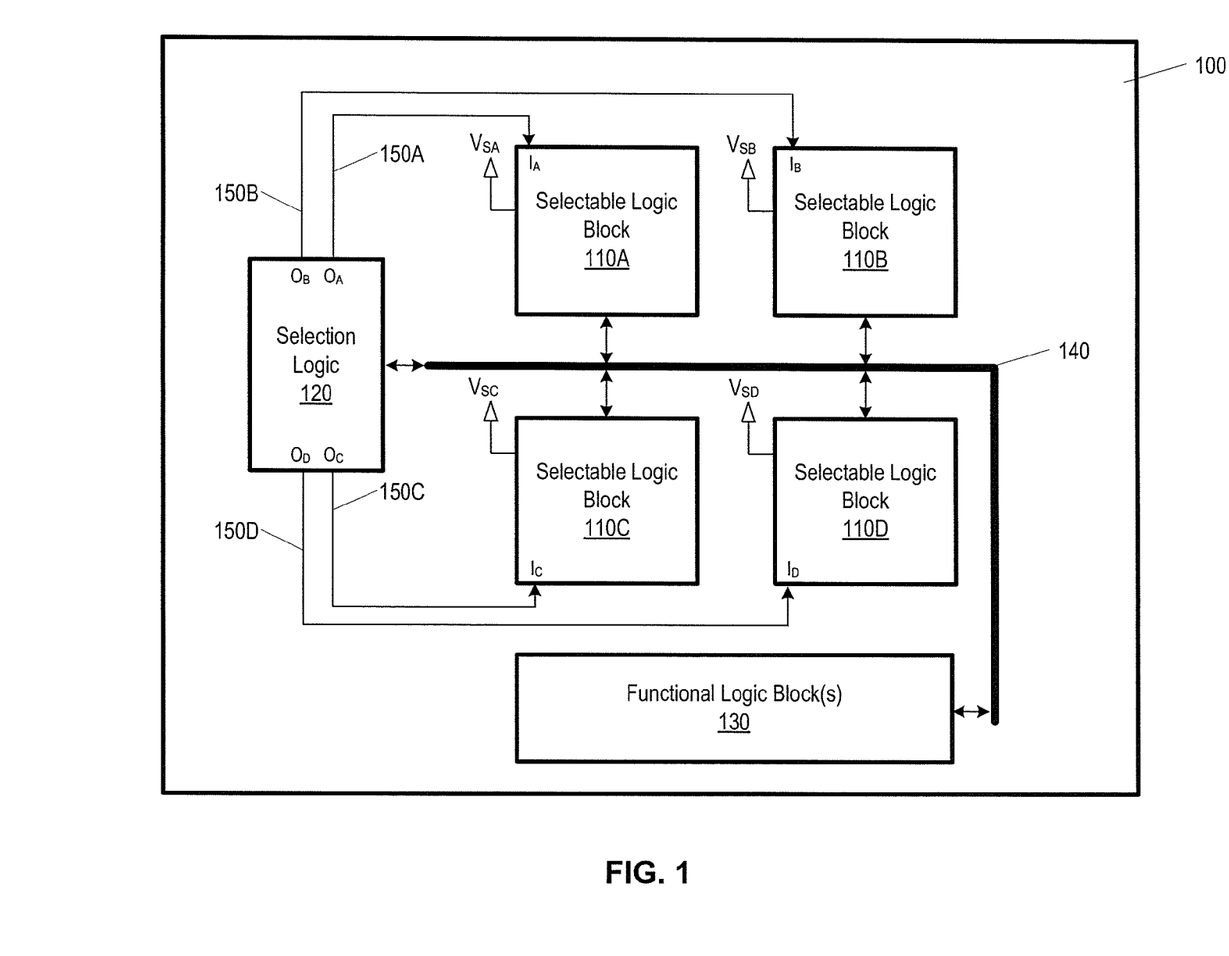
FIG. 1 shows a block diagram of an exemplary integrated circuit in accordance with aspects of the present invention.

FIG. 1 shows an exemplary structure for an integrated circuit chip 100 in accordance with aspects of the invention. Integrated circuit chip 100 includes a number of selectable logic blocks 110A . . . 110D, selection logic 120, one or more functional logic block(s) 130, a data bus 140, and selection lines 150A . . . 150D. Selectable logic blocks 110A . . . 110D are included in respective voltage islands that are electrically linked to corresponding power sources $V_{SA}$ . . . $V_{SD}$. Additionally, selectable logic blocks 110A . . . 110D are communicatively linked to functional logic block(s) 130 via data bus 140. Functional logic blocks(s) 130 can include, for example, one or more processors, memory, storage, communication, data buses, etc. Because the structure of integrated circuit chip 100 is exemplary, it should be understood that integrated circuit chips in accordance with the present invention are not limited to the structure shown in FIG. 1. For example, integrated circuit chip 100 can have fewer or greater numbers of selectable logic blocks 110A . . . 110D. Further, the interconnections between selectable logic blocks 110A . . . 110D and/or functional logic block(s) 130 are not limited to data bus 140 and, instead, can be any kind of wired or wireless data link (e.g., serial or parallel).

In accordance with aspects of the invention, outputs $O_A$ . . . $O_D$ of selection logic 120 is linked to respective inputs $I_A$ . . . $I_D$ of selectable logic blocks via selection lines 150A . . . 150D, by which selection logic 120 selectively disables one or more of selectable logic blocks 110A . . . 110D. That is, selection logic 120 controls a particular one of selectable logic blocks 110A . . . 110D to disconnect its respective power source $V_{SA}$ . . . $V_{SD}$ and/or other functional logic blocks of integrated circuit 100 (e.g., by disconnecting data bus 140). For example, a chip fabricator performing post-manufacturing testing of an integrated circuit chip can trigger selection logic 120 to disable redundant logic blocks identified as surplus or defective. In embodiments, selectable logic blocks 110A . . . 110D include data enable logic that is only activated by a signal from selection logic 120.

In an exemplary implementation, integrated circuit chip 100 can be a partial good voltage island chip designed to use less than the full number (e.g., three of four) of redundant processor cores. Each of the redundant processor cores can be included in a respective one of selectable logic blocks 110A . . . 110D. Post-manufacturing testing of integrated circuit chip 100 can determine that one redundant processor core of selectable logic block 110A is surplus and/or defective. Information indicating the good and/or bad processor cores can be stored in selection logic 120. Based on the stored information, selection logic 120 can disable the surplus or defective processor core by transmitting a disable signal to input $I_A$ of selectable logic block 110A via output $O_A$ and signal line 150A to disconnect the surplus or defective processor core from voltage source $V_{SA}$ and/or data bus 140. Additionally, selection logic 110 can enable selectable logic blocks 110B . . . 110D by transmitting respective enable signals to inputs $I_B$ . . . $I_D$ via outputs $O_A$ . . . $O_D$ and selection lines 150B . . . 150D. With selectable logic block 110A disabled and selectable logic blocks 110B . . . 110D enabled, integrated circuit chip 100 can function as designed.

In accordance with aspects of the invention, selectable logic blocks 110A . . . 110D and selection logic 120 are manufactured based on predesigned elements stored in a library of integrated circuit elements usable in integrated circuit chip 100. Output connections $O_A$ . . . $O_D$ of selection logic 120 and respective input connections $I_A \ldots I_D$ of selectable logic blocks 110A . . . 110D are specified in the software definitions such that they can connect in a single, valid way. In the case of selectable logic blocks 110A . . . 110D, which are instances of the same logic, the respective input connection $I_A \ldots I_D$ of each instance is modified to uniquely identify its respective logic block.

In embodiments of the present invention, each output connection $O_A \ldots O_D$ and input connection $I_A \ldots I_D$ is a pin that is assigned a different type in the software definitions of selectable selection logic 120 and logic blocks 110A . . . 110D, and each pin type is only permitted to connect to a particular pin type. Accordingly, selection lines 150A . . . 150D connect the logic of selection logic 120 and selectable logic blocks 110A . . . 110D in a prescribed manner. Thus, for the purposes of verification, so long as the internal logic of selection logic 120 and selectable logic blocks 110A . . . 110D is correct, and the interconnections of selection lines 150A . . . 150D are structurally verified, then integrated circuit 100 can be expected to function as designed. Accordingly, chip-level verification of selection logic 120 and selectable logic blocks 110A . . . 110D involves testing only one or only a few permutations (e.g., a number corresponding to the number of selectable logic blocks 110A . . . 110D that can be disabled, which is one in this example). Exhaustive chip-level verification of all permutations to show that disabling any selectable logic blocks 110A . . . 110D is not required.

Figure 2:
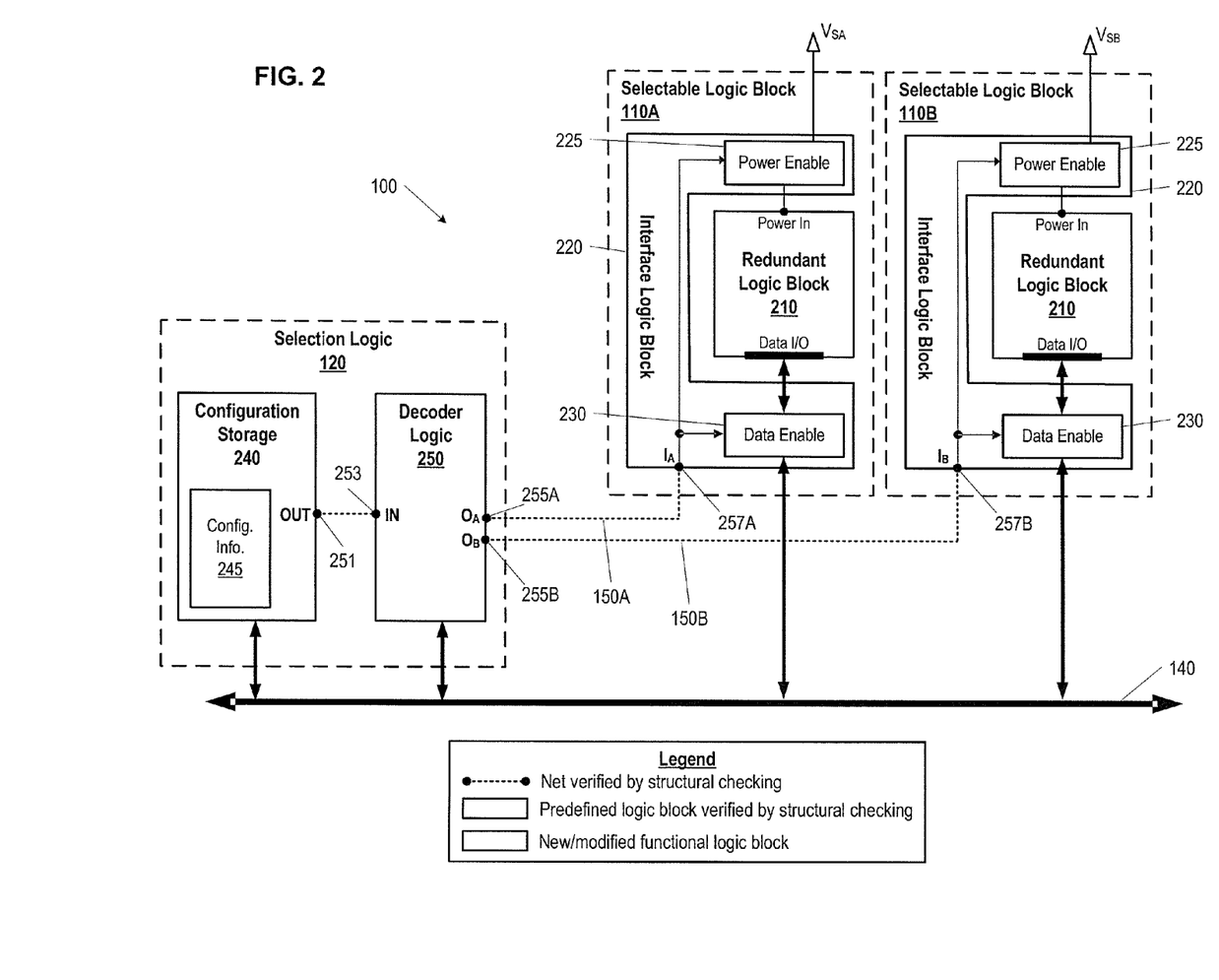
FIG. 2 shows a block diagram of an exemplary integrated circuit in accordance with aspects of the present invention.

FIG. 2 shows a block diagram illustrating details of exemplary integrated circuit chip 100 in accordance with aspects of the invention. More specifically, FIG. 2 shows details of exemplary selectable logic blocks 110A and 110B and selection logic 120. Notably, while only selectable logic blocks 110A and 110B are depicted in FIG. 2 for the sake of detail, the following description regarding selectable logic blocks 110A and 110B applies equally to selectable logic blocks 110C and 110D in FIG. 1, and any number of selectable logic blocks in other chips in accordance with aspects of the invention.

In accordance with aspects of the invention, each of selectable logic blocks 110A and 110B include an instance of redundant logic blocks 210 and an instance of interface logic blocks 220. Interface logic blocks 220 can provide an interface (e.g., a wrapper) that separates (e.g., fences) each of redundant logic blocks 210 from the other functional components of integrated circuit chip 100 (e.g., functional logic block(s) 130 in FIG. 1). In embodiments, interface logic blocks 220 are selectively controlled by selection logic 120 via selection lines 150A and 150B. Interface logic blocks 220 can include power enable logic 225 and data enable logic 230. In embodiments, power enable logic 225 provides switchable connections between the power inputs (i.e., Power In) of redundant logic blocks 210 and respective power sources $V_{SA}$ and $V_{SB}$ of redundant logic blocks 210. Thus, power to redundant logic blocks 210 from power sources $V_{SA}$ and $V_{SB}$ can be selectively reduced or cut-off. In embodiments, power enable logic 225 is a voltage island header device that enables selection logic 120 to turn-on or turn-off power to the voltage islands. Logic that controllably reduces and/or cuts-off power from a source is understood by those of skill in the art such that further explanation of such logic is not necessary to understand the present invention.

Still referring to FIG. 2, data enable logic 230 can provide each interface logic block 220 with a switchable connection between respective data connections (e.g., pins) of the redundant logic blocks 210 and other elements of integrated circuit chip 100. In embodiments, data enable logic 230 disconnects redundant logic blocks 210 from data bus 140. For example, data enable logic 230 can include multiplexer logic and/or logic gates that interface with the inputs and outputs (i.e., Data I/O) of redundant logic blocks 210 to disconnect the inputs and outputs when a corresponding one of selectable logic blocks 110A and 110B is disabled. Logic devices that multiplex and/or gate signals are understood by those of skill in the art such that further explanation of such devices is not necessary to understand the present invention.

In accordance with aspects of the invention, interface logic blocks 220 are instances of predesigned elements that are modified to interface with particular redundant logic block 210. For example, a designer can create a new integrated circuit design including instances of redundant logic block 210. The designer can modify the design to wrap each instance of redundant logic block 210 in a corresponding interface logic block 220 that fences redundant logic block 210 from other functional logic of integrated circuit chip 100. This modification can involve changing the interface logic block 220 to interface with the particular data inputs and outputs (i.e., Data I/O) of redundant logic block 210. For example, the designer can customize multiplexer and/or gates of interface logic block 220 based on the data inputs and outputs of redundant logic block 210. The designer can then perform verification testing on the single instance of the combined redundant logic block 210 and interface logic block 220 (i.e., selectable logic block 110A or 110B) to verify their function. In embodiments, the designer can use modeling and simulation software to verify that power enable logic 225 and data enable logic 230 of interface logic block 220 function with the inputs and outputs of redundant logic blocks 210. The designer can also use modeling and simulation software to verify that redundant logic block 210 and interface logic block 220 function together as selectable logic block 110A or 110B and that their combination satisfies design and interface requirements of redundant logic blocks 210 within integrated circuit chip 100.

Further, in accordance with aspects of the invention, selection logic 120 includes configuration storage 240 and decoder block 250. In embodiments, configuration storage 240 is a logic device comprising non-volatile storage that records chip-specific configuration information 245. In embodiments, configuration storage 240 comprises an electronic chip identifier ("ECID") in which configuration information 245 is stored by fusible links that encode information identifying selectable logic blocks 110A and 110B for enablement and/or disablement (i.e., good or bad) by selection logic 120. Configuration information 245 can be determined for a particular integrated circuit chip 100 based on post-manufacturing testing. For example, after manufacturing integrated circuit chip 100, operational testing may determine that redundant logic block 210 in selectable logic block 110A is bad (i.e., failed one or more tests required for operation of integrated circuit 100) and that redundant logic block 210 of selectable logic block 110B is good (i.e., passed all tests required for operation of integrated circuit 100). In such case, configuration information 245 can be stored in configuration storage 240 identifying selectable logic block 110A for disablement and/or selectable logic block 110B for enablement.

In embodiments, decoder block 250 is a logic device that decodes configuration information 245 stored in configuration storage 240 and translates it into enable/disable signals for selectable logic blocks 110A and 110B. In embodiments, based on configuration information 245 for a particular integrated circuit chip 100, decoder logic 250 decodes and maps configuration information 245 to output 255A ($O_A$) and output 255B ($O_B$), which connect to inputs $I_A$ and $I_B$ of interface logic blocks 220 via selection lines 150A and 150B. For example, decode block 250 can be a parameterized "N:M" decode block. Any number of conventional decode schemes could be implemented to translate from the enable/disable information stored in configuration storage 240 to enable/disable signals (e.g., translate from N fuses to M enables, where N<M). Such decoding schemes are familiar to those of ordinary skill in the relevant arts such that further explanation is not necessary to understand the present invention. Decoder logic 250 can be designed to handle any combination of decodes for any number of redundant logic blocks 210 that may be included in the design of integrated circuit chip 100. Verification of decoder logic 250 can be performed on a standalone basis using simulation to verify it decodes and map configuration information 245.

In accordance with aspects of the invention, configuration storage 240 and decoder logic 250 are predefined elements having particular allowed connections between the two. Likewise, the connections between decoder logic 250 and interface logic blocks 220 are predefined, wherein each instance of interface logic block 220 has a particular allowed connection to decoder block 250. In embodiments, output 251 of configuration storage 245 is only allowed to validly connect in a particular fashion to input 253 of decoder logic 250. Further, output 255A ($O_A$) and output 255B ($O_B$) of decoder logic 250 are only allowed to validly connect to an input 257A ($I_A$) and input 257B ($I_B$), respectively.

In accordance with aspects of the invention, each instance of interface logic block 220 included in the design of integrated circuit chip 100 is modified to uniquely identify its respective input 257A, 257B. In embodiments, the software code (e.g., VHDL) defining models of configuration storage 240, decoder logic 250, and interface logic blocks 220 can define a specific type of pin that each input and output is permitted to connect (e.g., by selection lines 150A and 150B). This ensures the correct logical structure is implemented without having to exhaustively model and simulate the function of interface logic blocks at the chip level. Instead, chip-level structural verification (e.g., electronic rule checking) can be performed to verify all the connections for enabling and disabling redundant logic blocks 210 are valid based on their respective pin types. This results in a substantial simplification over the conventional method of verification in which a vast matrix of different fuse values is simulated to ensure all possible combinations of fuse values produce a correct subset of redundant logic blocks that are located on powered up voltage islands and connected to active data paths.

Additionally, in accordance with aspects of the invention, incorporation of selection logic 120 and selectable logics blocks 110A and 110B in the design of integrated circuit chip 100 greatly simplifies the design and verification of integrated circuit chip 100. That is, each selectable logic block 110A or 110B is a functionally equivalent instance that can be individually enabled and/or disabled by predefined and pre-verified selection logic 120. As such, it is not necessary to perform functional verification on every possible permutation of enabled/disabled redundant logic blocks. Instead, so long as configuration storage 240, decoder logic 250, and selectable logic blocks 110A and 110B have been verified as standalone elements and are validly connected as specified in their respective element definitions (which can be verified by structural verification), selection logic 120 will function properly. Thus, functional verification is not required for all possible permutations of enabled/disabled redundant logic blocks.

Based on the forgoing description of selectable logic blocks 110A and 110B and selection logic 120, aspects of the present invention provide for simplified verification of integrated circuits including voltage-islanded redundant logic blocks. For example, a designer can provide a design for integrated circuit chip 100, including a redundant logic blocks 210, which can be a unique or custom design. A chip fabricator can maintain a predefined library of integrated circuit elements, including configuration storage 240, decoder logic 250, and interface logic blocks 220. The library can include different versions of the configuration storage 240, decoder logic 250, and/or interface logic blocks 220 corresponding to different fabrication technologies. The designer can work with the chip fabricator to combine an instance of redundant logic block 210 with a respective interface logic block 220 by modifying the predefined element to interface with the particular inputs/outputs of redundant logic blocks 210 of the designer. The designer may customize data enable 230 (multiplexing and gating logic) of interface logic block 220 based on redundant logic block 210 and can store the combination as an instance of selectable logic blocks 110A, 110B. The designer can then verify the function of an instance of selectable logic block 110A, 110B via simulation. Since the instance of a selectable logic block 110A, 110B is functionally equivalent to the other included in the design of integrated circuit chip 100, any number of selectable logic block 110A and 110B can be instantiated into a chip design. Each instance would be controllable by decoder logic 250, which is predesigned to decode and map disable and/or enable signals to any number of selectable logic blocks that may be reasonably included in a given design of an integrated circuit. Integrated circuit chip 100, including selectable logic blocks 110A and 110B and selection logic 120 can then be simulated with a single valid chip configuration. For example, the design of integrated circuit chip 100 can be verified using a single, representative configuration in which configuration information 245 stores fuse values in which one of four selectable logic blocks 110A, 110B are disabled. Thus, in accordance with aspects of the present invention, the designer is freed from the burden of verifying every possible permutation of gating for disabling redundant logic blocks 210 in the design of integrated circuit chip 100.

Figure 3:
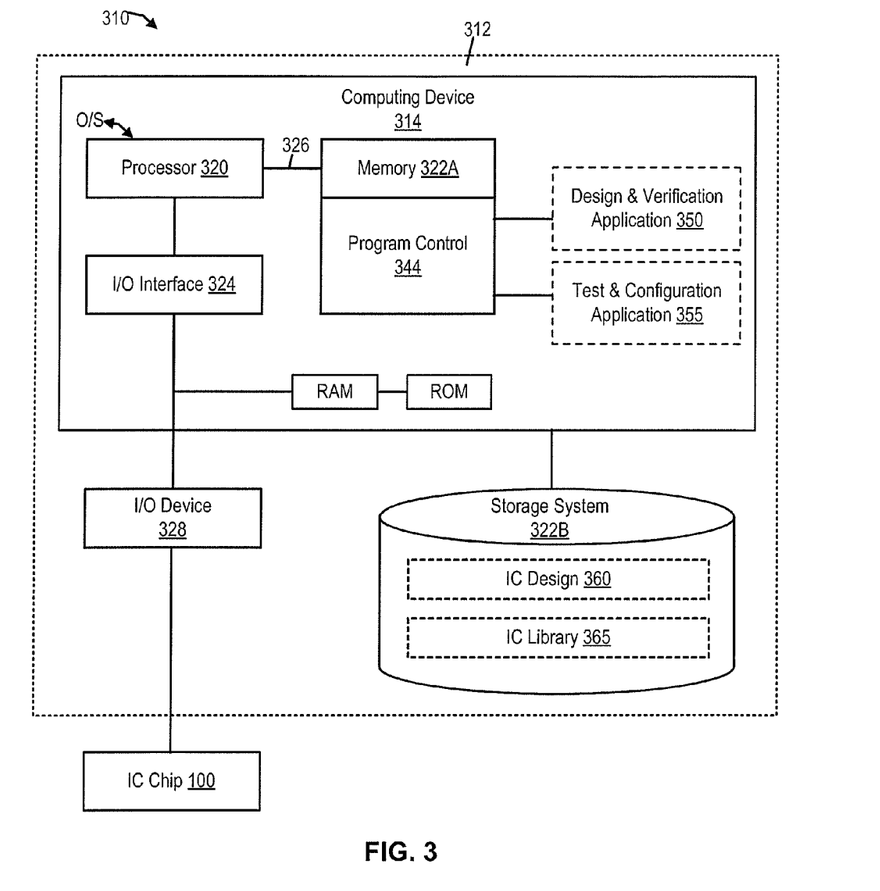
FIG. 3 shows a block diagram of an exemplary environment for implementing designs and processes in accordance with aspects of the invention.

FIG. 3 is an exemplary environment 310 for implementing the steps in accordance with aspects of the invention. To this extent, the environment 310 includes a server or other computing infrastructure 312 that can perform the processes described herein. In particular, the computer infrastructure 312 includes a computing device 314. The computing device 314 can be resident on a network infrastructure or computing device of a third party service provider (any of which is generally represented in FIG. 3).

The computing device 314 also includes a processor 320, memory 322A, an I/O interface 324, and a bus 326. The memory 322A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 314 is in communication with the external I/O device 328 and a storage system 322B. For example, the I/O device 328 can comprise any device that enables an individual to interact with the computing device 314 (e.g., user interface) or any device that enables the computing device 314 to communicate with one or more other computing devices using any type of communications link. The external I/O device/resource 328 can be for example, a handheld device, PDA, handset, keyboard etc. In addition, I/O device 328 can be a device that enabled computing device to interface with integrated circuit chip 100 to perform testing and configuration functions. For example, I/O device 328 can be an integrated circuit testing apparatus.

In general, the processor 320 executes computer program code (e.g., program control 344), which can be stored in the memory 322A and/or storage system 322B. Moreover, in accordance with aspects of the invention, the program control 344 controls an integrated circuit design and verification application 350 and/or test and configuration application 355 to perform one or more of the processes described herein. Design and verification application 350 and/or test and configuration application 355 can be implemented as one or more sets of program code in the program control 344 stored in memory 322A as separate or combined modules. Additionally, design and verification application 350 and/or test and configuration application 355 can be implemented as separate dedicated processors or a single or several processors to provide the function of these tools.

While executing the computer program code, the processor 320 can read and/or write data to/from memory 322A, storage system 322B, and/or I/O interface 324. The program code executes the processes of the invention, for example, design and verification application 350 and/or test and configuration application 355. Further, data read and/or write data to/from the memory 322A, storage system 322B, and/or I/O interface 324 can include an integrated circuit design 360 that defines integrated circuit 100 including its design rules, elements, and their interrelationships. Bus 326 provides a communication link between each of the components in computing device 314.

In accordance with aspects of the invention, design and verification application 350 is computer program code stored in, for example, memory 322A and/or storage system 322B that, when executed by the processor 320, causes computing device 314 to determine and/or modify integrated circuit design 360. Design and verification application 350 can include one or more software or hardware modules for designing and modeling integrated circuit designs using a hardware description language, such as VERILOG or VHDL. For instance, the design and verification application 350 can be a synthesis/placement CAD tool that reads in design definitions (e.g., VHDL), physical area constraints, timing constraints, power constraints, design library information, synthesis rules, and operating conditions. Using these various parameters, design application 350 can determine models and a layout of elements in an integrated circuit design stored in, for example, integrated circuit library 365. The determined layout and associated information can be stored by computing device 314 in storage system 322B as integrated circuit design 360.

Additionally, design and verification application 350 can include one or more software or hardware modules for verifying integrated circuit design 360. For instance, design and verification application 350 can verify the structural and functional requirements of integrated circuit design 360 based on design definitions, physical area constraints, timing constraints, power constraints, design library information, synthesis rules, and operating conditions. For example, using electronic rule checking, design and verification application 350 can verify that inputs and/or outputs of elements in the design of integrated circuit chip 100 (e.g., interface logic blocks 220, configuration storage 240, and decoder logic 250) are interconnected in a single, valid manner specified by the design definitions in integrated circuit library 365. Additionally, using modeling and simulation, design and verification application 350 can perform device-level verification of, e.g., selectable logic blocks (e.g., selectable logic blocks 110A . . . 110D), and chip-level verifications of, e.g., integrated circuit design 360.

In accordance with aspects of the invention, test and configuration application 355 is computer program code stored in, for example, memory 322A and/or storage system 322B that, when executed by the processor 320, causes computing device 314 to test the operation of a particular integrated circuit chip 100 after its manufacture to verify that the chip operates as designed. Test and configuration application 355 can include one or more software or hardware modules for inputting test patterns into IC chip 100 under various operation and environmental conditions to determine whether the expected results are output. For example, test and configuration application 355 can determine whether one or more redundant logic blocks (e.g., redundant logic block 210) are defective and, if so, record such information on integrated circuit chip 100 (e.g., as configuration information 245 in configuration storage 240).

The computing device 314 can comprise any general purpose computing article of manufacture capable of executing computer program code installed thereon (e.g., a personal computer, server, etc.). However, it is understood that the computing device 314 is only representative of various possible equivalent-computing devices that can perform the processes described herein. To this extent, in embodiments, the functionality provided by the computing device 314 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 312 is only illustrative of various types of computer infrastructures for implementing the invention. For example, in embodiments, computing infrastructure 312 comprises two or more computing devices (e.g., a server cluster) that communicate over any type of communications link, such as a network, a shared memory, or the like, to perform the process described herein. Further, while performing the processes described herein, one or more computing devices on computing infrastructure 312 can communicate with one or more other computing devices external to computing infrastructure 312 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 4:
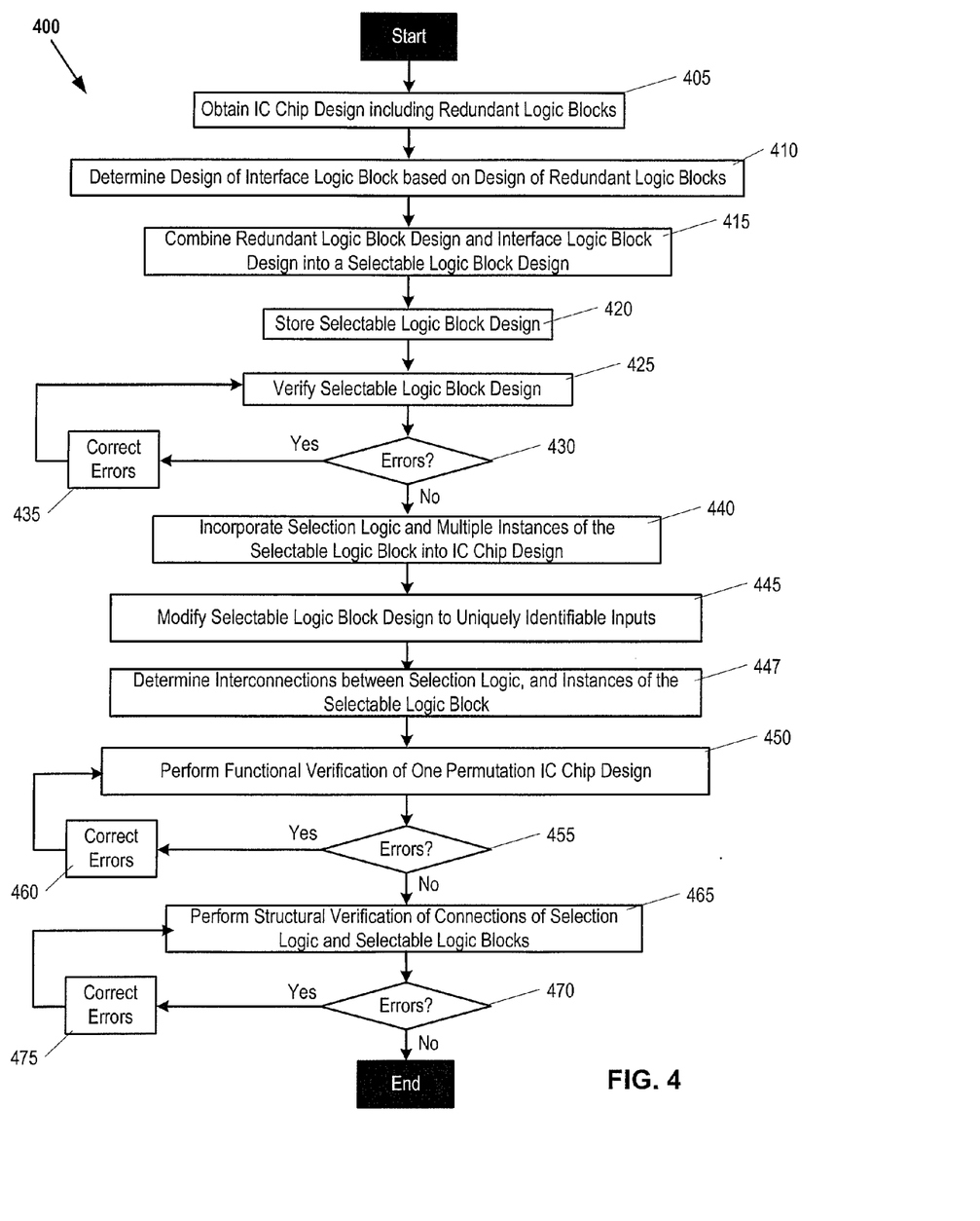
FIG. 4 shows a flow diagram of an exemplary process for generating and verifying a design for exemplary integrated circuits in accordance with aspects of the present invention.
Figure 5:
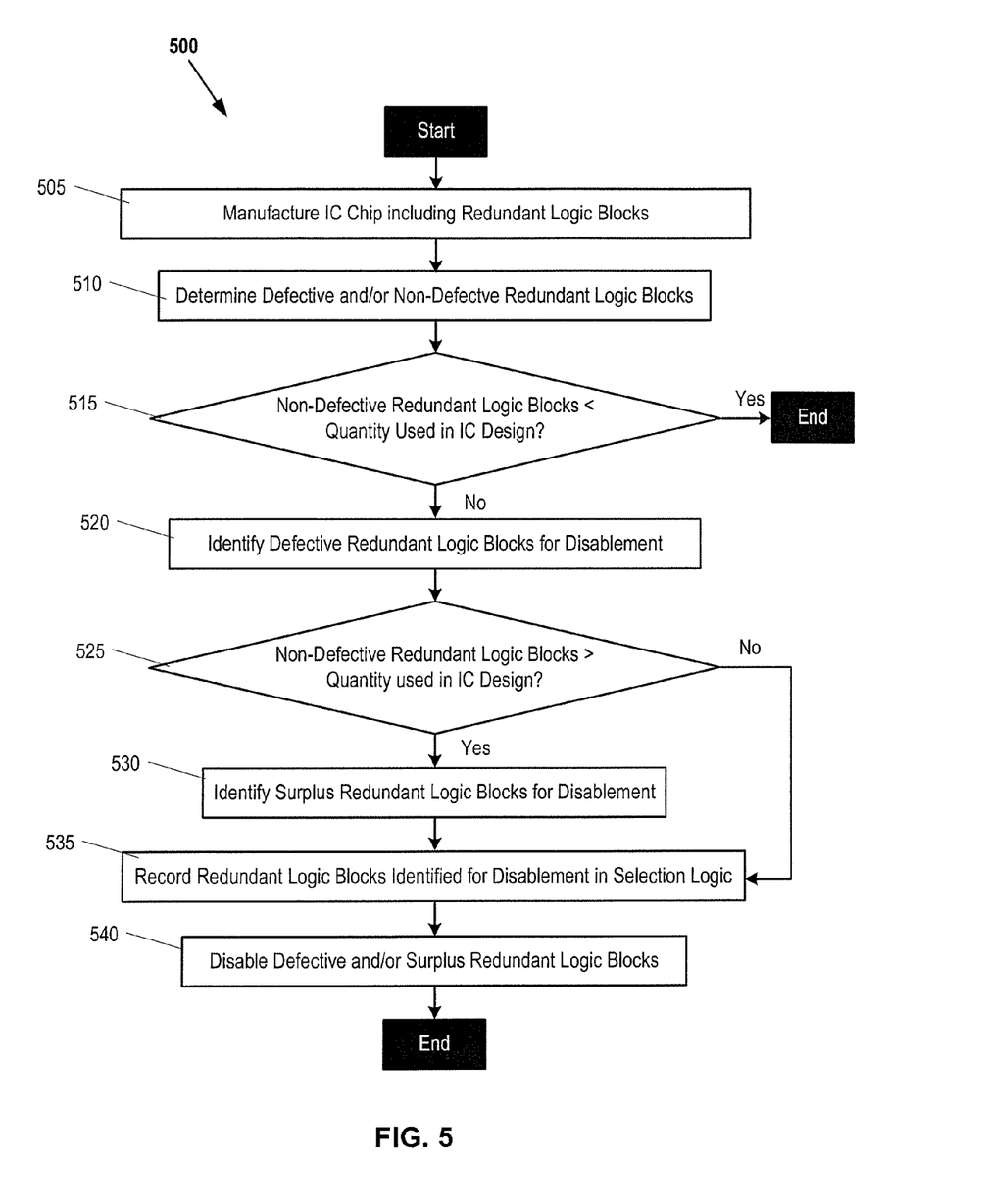
FIG. 5 shows a flow diagram of an exemplary process for configuring exemplary integrated circuits in accordance with aspects of the present invention.

FIGS. 4 and 5 show exemplary flows for performing aspects of the present invention. The steps of FIGS. 4 and 5 can be implemented to design and/or test integrated circuit chip 100 of FIGS. 1 and 2 using the computing device 314 of FIG. 3.

The flowcharts in FIGS. 4 and 5 illustrate the architecture, functionality, and operation of possible implementations of systems, devices, methods, and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can some-times be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 4 shows an exemplary process flow 400 for designing and verifying integrated circuit chips in accordance with aspects of the present invention. As detailed in the process below, design and verification of an integrated circuit chip (e.g., integrated circuit chip 100) including redundant logic blocks (e.g., redundant logic blocks 210) is simplified by wrapping each redundant logic block in interface logic blocks (e.g., interface logic blocks 220) that are controllable by predesigned and pre-verified selection logic (e.g., configuration storage 240 and decoder logic 250).

At step 405, a design for an integrated circuit chip including redundant logic blocks is obtained. In embodiments, an automated design application (e.g., design and verification application 350) can store a design (e.g., integrated circuit design 360) for integrated circuit chip 100 in storage system (e.g., storage system 322B). For example, a designer may provide a design for an integrated circuit including partial good voltage island blocks. The designer may be a customer of a chip fabricator that provides the design for fabrication.

At step 410, the designer and/or the automated design application determines a design of an interface logic block (e.g., interface logic block 220) based on the redundant logic blocks. In embodiments, the interface logic block can be a predefined element stored in a library (e.g., integrated circuit library 365). The designer and/or automated design application can retrieve the interface logic block from the library and modify it based on the redundant logic blocks. For example, the designer and/or the automated design application can modify power connections (e.g., power enable logic 225) and input/output connections (e.g., gates and/or multiplexers of data enable logic 230) of the interface logic block to correspond with the power and input/output connections of the redundant logic block. Such modifications depend on the connections of the particular redundant logic block and are within the ability of one of ordinary skill in the art such that further explanation is not necessary.

At step 415, the designer and/or the automated design application combines the modified interface logic block determined at step 410 and redundant logic block into a selectable logic block (e.g., selectable logic blocks 110A . . . 110D). At step 420, the designer and/or the automated design application stores the selectable logic block (e.g., in integrated circuit design 360 and/or integrated circuit library 365) for subsequent, verification and instantiation in the design of the integrated circuit chip.

At step 425, the designer and/or the automated design application performs verification testing on the selectable logic block determined at step 420. The verification testing can include structural and functional testing to ensure that the connections between the combined interface logic block and redundant logic block are correct and the selectable logic block function as designed. The verification testing can include structural testing that determines whether sizes, spacing, and connections between elements of the combined interface logic block and redundant logic block are correct and/or within design rules. The verification testing can also include functional testing that determines whether the function (e.g., inputs, outputs, timing, power consumption, etc.) of the combined interface logic block and redundant logic block satisfy functional and interface design requirements of the redundant logic block. For example, the functional testing may include simulating the operation of the selectable logic block. Notably, in accordance with aspects of the present invention, since all the selectable logic blocks in the integrated circuit design are equivalent, verification testing performed need only be performed on a single instance of the selectable logic block.

At step 430, if the verification step 425 identifies any errors in the selectable logic block, then the designer and/or the automated design application corrects the errors at step 435 and the process returns to step 425. If no errors are determined in the selectable logic block at step 425, then the process advances to step 440. At step 440, the designer and/or the automated design application modify the design of the integrated circuit chip to incorporate selection logic (e.g., selection logic 120) and multiple instances of the selectable logic block that was verified at step 425. The selection logic can include a non-volatile data storage device (e.g., configuration storage 240) and a decoder device (e.g., decoder logic 250). The multiple instances of the selectable logic block can be substituted in the integrated circuit chip design obtained at step 405 in place of the redundant logic blocks originally included in the design.

At step 445, the designer and/or the automated design application modify the instances of the selectable logic blocks incorporated into the integrated circuit design at step 440 such that their respective inputs (e.g., inputs 257A ($I_A$) and 257B ($I_B$)) are uniquely identified. In embodiments, the unique identifiers may be based on a respective location, address, and/or identifier assigned to the selectable logic blocks. For example, using the unique identifiers, pin types of the inputs to the interface logic block instances (e.g., inputs $I_A$ and $I_B$ of interface logic blocks 220) can be modified to have a unique type identifier.

At step 447, the designer and/or the automated design application determine signal lines (e.g., signal lines 150A . . . 150D) connecting the selection logic and the selectable blocks. In accordance with aspects of the invention, element definitions of the configuration storage, the decoder, and/or the interface logic blocks define inputs and/or outputs of these elements such that valid signal lines between these elements are required to make particular connections. As described above, in embodiments of the present invention, the element definitions include special types of pins that limit which other pins can connect. For example, a predefined output pin of the configuration storage (e.g., output 251) can be defined (e.g., in VHDL) such that the signal line connecting it with the decoder is only valid if connected with the predefined input pin of the decoder (e.g., input 253). Likewise, the output pins of the decoder (e.g., outputs 255A ($O_A$), 255B ($O_B$)) can be defined such that signal lines connecting them with the interface logic blocks are only valid if connected with the particular input pins of the interface logic block instances (e.g., inputs 257A ($I_A$), 257B ($I_B$)) that were modified in step 445 to be uniquely identifiable. Accordingly, structural verification (e.g., electronic rule checking) will identify any invalid connects between the blocks At step 450, the designer and/or the automated design application performs functional verification of one permutation integrated circuit chip design from step 445. In accordance with the partial-good design of the integrated circuit, the verification at step 450 verifies the integrated circuit design configured with one or more instances of the selectable logic block disabled. For example, where the selectable logic blocks include redundant processor cores and the IC is designed to function with two surplus or defective processor cores, verification step 450 can simulate the operation of the integrated circuit chip with configuration information (e.g., configuration information 245) specifying any two of the selectable logic blocks as disabled. If any errors are identified at step 455 as a result of the verification at step 450, then the designer and/or the automated design application corrects the errors at step 460, and the process returns to step 450. If no errors are determined in the integrated circuit at step 455, then chip-level verification with respect to the selection logic is complete and the process continues to step 465.

At step 465, the designer and/or the automated design application performs structural verification of connections of the selection logic and the selectable logic blocks. For example, electrical rule checking can be performed to verify that the inputs and outputs of the configuration storage, the decoder device, and selectable logic blocks are connected in a valid manner as specified in the respective element definitions. If any invalid connections are identified at step 470 as a result of the verification at step 465, then the designer and/or the automated design application corrects the errors at step 475 and the process returns to set 465. In no errors are identified at step 470, then the process ends.

FIG. 5 shows an exemplary process flow 500 for configuring an exemplary integrated circuit in accordance with aspects of the present invention. After a particular integrated circuit chip is manufactured based on the design of the integrated circuit chip determined in FIG. 4 (e.g., integrated circuit chip 100), the integrated circuit chip can be tested, and the selectable logic blocks can be configured by the selection logic. For example, testing of the integrated circuit chip can determine whether or not the integrated circuit chip, as manufactured, includes any defective redundant logic blocks or any surplus redundant logic blocks. Based on the outcome of the testing, the defective or surplus redundant logic blocks can be disabled by the selection logic incorporated into the design of the integrated circuit chip by the process shown in FIG. 4.

At step 505, a fabricator manufactures the integrated circuit chip (e.g., integrated circuit chip 100) including redundant logic blocks using, for example, the design determined by the process shown in FIG. 4 (e.g., integrated circuit design 360). Thus, in accordance with aspects of the invention, the integrated circuit chip includes selection logic (e.g., selection logic 120) and selectable logic blocks (e.g., selectable logic blocks 110A . . . 110D), including redundant logic blocks (e.g., redundant logic blocks 210).

At step 510, a fabricator and/or a test and configuration process (e.g., test and configuration application 355) determines defective and/or non-defective redundant logic blocks (e.g., redundant logic block 210) in the integrated circuit chip manufactured at step 505. For example, the integrated circuit can be placed in a test bench linked to a computing system (e.g., computing device 314 via I/O device 328) configured to execute test routines under various operational and environmental conditions.

At step 515, the fabricator and/or the test and configuration process determines whether the quantity of non-defective redundant logic blocks determined at step 510 is less than the quantity required by the design of the integrated circuit chip. For example, the integrated circuit design can include ten redundant logic blocks and specify that eight of the redundant logic blocks are required for the integrated circuit chip to function. Accordingly, if the test and configuration process determines that three of the ten redundant logic blocks are defective at step 515, then the entire integrated circuit chip can be deemed defective and the process ends. If, at step 515, the fabricator and/or the test and configuration process determines that the quantity of non-defective redundant logic blocks is equal to or greater than the quantity required by the integrated circuit design, then at step 520, the test and configuration process identifies the defective redundant logic blocks determined at step 510 for disablement.

At step 525, the fabricator and/or the testing and configuration process determines whether the number of non-defective redundant blocks determined at step 510 is greater than the quantity required by the integrated circuit design. For example, if the integrated circuit design (e.g., integrated circuit design 360) includes ten redundant logic blocks and specified that eight of the redundant logic blocks are required for the integrated circuit chip to function, and if only one of the redundant logic blocks is defective, then one of the redundant blocks is surplus.

If, at step 525, it is determined that the number of non-defective redundant blocks determined at step 510 is not greater than the quantity required, then the test and configuration process advances to step 535. On the other hand, if at step 525, it is determined that the number of non-defective redundant blocks is greater than the quantity required, then the integrated circuit includes at least one surplus redundant block. In this event, at step 530, the fabricator and/or the test and configuration process identifies the one or more surplus redundant logic blocks for disablement. Since each instance of the redundant logic block is functionally the same, the test and configuration process can select any of the non-defective blocks.

At step 535, the fabricator and/or the test and configuration process records the redundant logic blocks identified for disablement at step 520 and step 530 in the configuration storage (e.g., as configuration information 245 in configuration storage 240). The information can be recorded by, for example, storing information identifying the surplus or defective redundant logic blocks to be disabled in the memory of the configuration storage. Alternatively, the configuration storage can include a number of fuses and the test and configuration process can blow select fuses to encode information identifying the redundant logic blocks to be disabled.

At step 540, the fabricator and/or the test and configuration process controls the selectable logic blocks to disable the redundant logic blocks recorded at step 535 in the configuration storage. For example, the fabricator and/or the testing and configuration process can cause interface logic of the selectable logic blocks to disconnect the identified redundant logic blocks from their respective power sources via a power enable circuit (e.g., power enable logic 225) and from the other logic blocks of the integrated circuit chip (e.g., logic blocks 130) via a data enable circuit (e.g., data enable logic 230).

Figure 6:
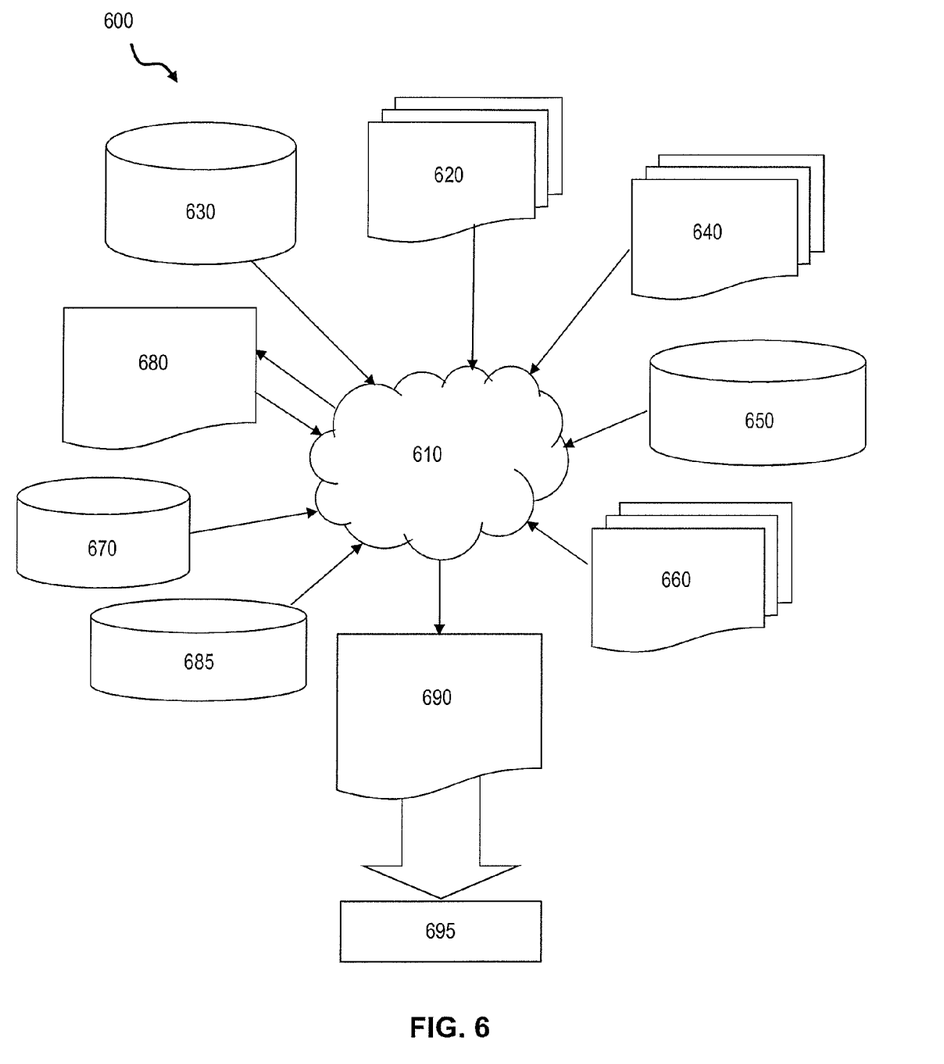
FIG. 6 shows a flow diagram of a design process used in semiconductor design, manufacture, and/or test.

FIG. 6 is a flow diagram of a design process used in semiconductor design, manufacture, and/or test. FIG. 6 shows a block diagram of an exemplary design flow 600 used for example, in semiconductor integrated circuit logic design, simulation, test, layout, and manufacture. Design flow 600 includes processes, machines and/or mechanisms for processing design structures or devices to generate logically or otherwise functionally equivalent representations of the design structures and/or devices described above and shown in FIGS. 1 and 2. The design structures processed and/or generated by design flow 600 can be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an integrated circuit design process, such as designing, manufacturing, or simulating a circuit, component, device, or system. For example, machines can include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 can vary depending on the type of representation being designed. For example, a design flow 600 for building an application specific integrated circuit (ASIC) can differ from a design flow 600 for designing a standard component or from a design flow 600 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 620 that is preferably processed by a design process 610. Design structure 620 can be a logical simulation design structure generated and processed by design process 610 to produce a logically equivalent functional representation of a hardware device. Design structure 620 can also or alternatively comprise data and/or program instructions that when processed by design process 610, generate a functional representation of the physical structure of a hardware device. Whether representing functional and/or structural design features, design structure 620 can be generated using electronic computer-aided design (ECAD) such as implemented by a core developer/designer. When encoded on a machine-readable data transmission, gate array, or storage medium, design structure 620 can be accessed and processed by one or more hardware and/or software modules within design process 610 to simulate or otherwise functionally represent an electronic component, circuit, electronic or logic module, apparatus, device, or system such as those shown in FIGS. 1 and 2. As such, design structure 620 can comprise files or other data structures including human and/or machine-readable source code, compiled structures, and computer-executable code structures that when processed by a design or simulation data processing system, functionally simulate or otherwise represent circuits or other levels of hardware logic design. Such data structures can include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 1 and 2 to generate a netlist 680 which can contain design structures such as design structure 620. Netlist 680 can comprise, for example, compiled or otherwise processed data structures representing a list of wires, discrete components, logic gates, control circuits, I/O devices, models, etc. that describes the connections to other elements and circuits in an integrated circuit design. Netlist 680 can be synthesized using an iterative process in which netlist 680 is resynthesized one or more times depending on design specifications and parameters for the device. As with other design structure types described herein, netlist 680 can be recorded on a machine-readable data storage medium or programmed into a programmable gate array. The medium can be a non-volatile storage medium such as a magnetic or optical disk drive, a programmable gate array, a compact flash, or other flash memory. Additionally, or in the alternative, the medium can be a system or cache memory, buffer space, or electrically or optically conductive devices and materials on which data packets can be transmitted and intermediately stored via the Internet, or other networking suitable means.

Design process 610 can include hardware and software modules for processing a variety of input data structure types including netlist 680. Such data structure types can reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types can further include design specifications 640, characterization data 650, verification data 660, design rules 670, and test data files 685 which can include input test patterns, output test results, and other testing information. Design process 610 can further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 can also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690.

Design structure 690 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1 and 2. In one embodiment, design structure 690 can comprise a compiled, executable HDL simulation model that functionally simulates the devices shown in FIGS. 1 and 2.

Design structure 690 can also employ a data format used for the exchange of layout data of integrated circuits and/or symbolic data format (e.g. information stored in a GDSII (GDS2), GL1, OASIS, map files, or any other suitable format for storing such design data structures). Design structure 690 can comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1 and 2. Design structure 690 can then proceed to a stage 695 where, for example, design structure 690: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. An integrated circuit, comprising:
   selection logic; and
   a plurality of selectable logic blocks individually controllable by the selection logic,
   wherein the plurality of selectable logic blocks include:
      respective instances of a redundant logic block, and
      respective instances of an interface logic block that selectively disable the redundant logic blocks in the integrated circuit.

2. The integrated circuit of claim 1, wherein the respective instances of the interface logic block include:
   a switchable power connection between the respective instance of the redundant logic block and a power source; and
   a switchable data connection between the respective instance of the redundant logic block and functional logic blocks of the integrated circuit.

3. The integrated circuit of claim 1, wherein the selection logic comprises:
   a non-volatile storage device that stores information identifying one or more of the instances of the redundant logic block for disablement; and
   a decoder device that maps the stored information to particular input connections of the one or more instances of the interface logic block.

4. The integrated circuit of claim 3, wherein:
   an output of the non-volatile storage device has a predefined connection to an input of the decoder device; and
   outputs of the decoder device have predefined connections to respective inputs of the instances of the interface logic block.

5. The integrated circuit of claim 3, wherein the instances of the interface logic block have respective input connections that are unique to each instance of the interface logic block and have predefined connections to respective outputs of the decoder device.

6. The integrated circuit of claim 1, wherein the plurality of selectable logic blocks include data enable logic that is activated by the selection logic.

7. The integrated circuit of claim 1, wherein the redundant logic block is a partial-good voltage island logic block.

8. The integrated circuit of claim 1, wherein the integrated circuit includes a multi-core processor and the instances of the redundant logic block are processor cores of the multi-core processor.

9. The integrated circuit of claim 1, wherein the instances of the redundant logic block are blocks of memory logic.

10. A method for providing an integrated circuit, comprising:
    determining an interface logic block based on a redundant logic block included in the integrated circuit;
    combining the redundant logic block and the determined interface logic block into a selectable logic block;
    determining connections between selection logic and a plurality of instances of the selectable logic block, and;
    verifying that the selectable logic block satisfies design requirements of the redundant logic block.

11. The method of claim 10, wherein the determining the interface logic block comprises determining switchable connections between the interface logic block and data connections of the redundant logic block.

12. A method for providing an integrated circuit, comprising:
    determining an interface logic block based on a redundant logic block included in the integrated circuit;
    combining the redundant logic block and the determined interface logic block into a selectable logic block;
    determining connections between selection logic and a plurality of instances of the selectable logic block; and
    modifying inputs of the plurality of instances of the selectable logic block to have unique identifications associated with respective outputs of the selection logic.

13. The method of claim 12, wherein the unique identifications are pin types.

14. The method of claim 12, wherein determining the connections includes determining allowed connections between outputs of the selection logic and inputs of the plurality of instances of the selectable logic block based on the unique identifications.

15. The method of claim 12, further comprising verifying the connections between the selection logic and the inputs of the plurality of instances of the selectable logic block based on the unique identifications.

16. A method, comprising:
    identifying a first redundant logic block of a plurality of redundant logic blocks in an integrated circuit for disablement, wherein:
       the plurality of redundant logic blocks are included in respective selectable logic blocks; and
       the selectable logic blocks include interface logic blocks that fence the respective plurality of redundant logic blocks from functional logic of the integrated circuit;
    recording information identifying the first redundant logic block in selection logic of the integrated circuit; and
    based on the information recorded in the selection logic, disabling the first redundant logic block via the interface logic block of the respective selectable logic block.

17. The method of claim 16, wherein the identifying comprises determining that the first redundant logic block is defective or a surplus one of the plurality of redundant logic blocks.

18. The method of claim 16, wherein the disabling comprises:
    decoding the information recorded in the selection logic; and
    mapping the decoded information to the respective selectable logic block of the first redundant logic block.

19. The method of claim 16, wherein the disabling comprises disconnecting power and data connections using switching logic included in the respective selectable logic block of the first redundant logic block.

* * * * *